United States Patent [19]
Hodgson

[11] 3,865,010
[45] Feb. 11, 1975

[54] MACHINE TOOL FEED AND STOP MECHANISM

[75] Inventor: Brian Hodgson, Rowlands Gill, England

[73] Assignee: Machine Tool Divisional Services Limited, Coventry, England

[22] Filed: Dec. 3, 1973

[21] Appl. No.: 421,234

[30] Foreign Application Priority Data
Dec. 4, 1972    Great Britain ..................... 55805/72

[52] U.S. Cl. ........................... 90/4, 29/65, 82/21 A,
82/34 A, 90/11 E, 408/10, 408/14
[51] Int. Cl. ......................... B23f 5/22, B23b 21/00
[58] Field of Search .............. 408/10, 11, 14; 29/65;
82/21 A, 21 B; 90/14, 11 E, 4; 82/34 A

[56] References Cited
UNITED STATES PATENTS

| | | | |
|---|---|---|---|
| 2,801,617 | 8/1957 | Lelan | 82/21 A |
| 3,103,148 | 9/1963 | Le Brusque | 82/21 A X |
| 3,259,002 | 7/1966 | Huff et al. | 82/21 A |
| 3,487,729 | 1/1970 | Juhasz et al. | 408/14 |
| 3,492,897 | 2/1970 | Cunningham et al. | 82/34 X |
| 3,509,793 | 5/1970 | Muhl | 408/14 X |
| 3,552,238 | 1/1971 | Quackenbush | 408/10 X |
| 3,804,544 | 4/1974 | Adams | 408/14 |

FOREIGN PATENTS OR APPLICATIONS

| | | | |
|---|---|---|---|
| 1,146,326 | 9/1957 | Germany | 408/14 |
| 1,052,472 | 12/1966 | Great Britain | 408/14 |

*Primary Examiner*—Gil Weidenfeld
*Assistant Examiner*—W. R. Briggs
*Attorney, Agent, or Firm*—Watson, Cole, Grindle & Watson

[57] ABSTRACT

In a machine tool, the combination of a slide, means for advancing the slide, a screw which is movable both axially and rotationally, a non-rotatable nut which is carried by the screw and acts as a dead stop to arrest advance of the slide, means urging the screw yieldably in the direction of advance of the slide into engagement with a first abutment, means for advancing said first abutment after contact of the slide with the nut to permit of further advance of the slide, accompanied by advance of the nut and screw, at a speed governed by the speed of advance of said first abutment, and a second and fixed abutment which coacts with the screw to prevent further advance of the screw and nut and therefore of the slide.

5 Claims, 5 Drawing Figures

MACHINE TOOL FEED AND STOP MECHANISM

It is common practice in a machine tool to arrest the motion of a slide, advanced for example hydraulically, by a dead stop which acts solely to arrest the motion. It is often required to provide rapid movement of the slide towards and away from a working position, in which a tool is engaged or nearly so with a workpiece, and a slower feed movement of the slide during the actual cutting operation. When the dead stop is used solely to arrest the final slower feed movement, some completely independent mechanism must be used to govern the speed of motion of the slide.

Figure 1:
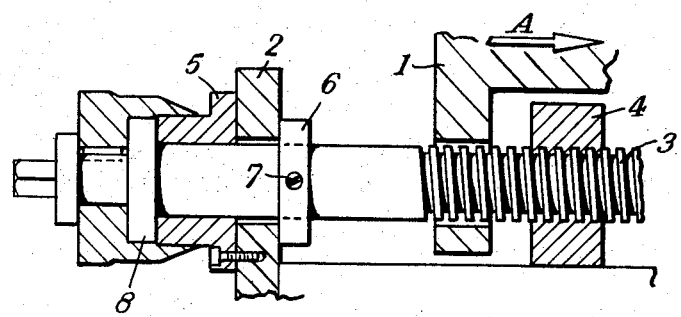

A typical conventional dead stop mechanism is illustrated diagrammatically in FIG. 1 of the accompanying drawings. In this, a nut 4 which is prevented from rotating is used to arrest the motion of a slide 1 which moves over a screw 3 towards the nut 4 in the direction of the arrow A. The unthreaded portion of the screw 3 extends through a collar 5, which is fixed to a frame member 2 of the machine and a shoulder 8 on the screw abuts against the end face of the collar 5. Another collar 6 held to the screw by a grub screw 7, abuts against the other side of the member 2. The screw 3 is accordingly held against axial movement. Nevertheless it can be rotated, by application of a wrench to its squared left hand end, to adjust the position of the nut 4 which acts as a dead stop.

The object of the invention is to provide a dead stop mechanism which is effective not only to arrest the slide at a determined final position of advance but is also capable of controlling the feed motion of the slide as it approaches its final position.

The dead stop mechanism according to the invention includes a screw which is movable both axially and rotationally and carries a non-rotatable nut which acts as a dead stop for a slide to be arrested, means urging the screw yieldably in the direction of advance of the slide into engagement with a first abutment, means for advancing said first abutment after contact of the slide with the nut to permit of further advance of the slide, accompanied by advance of the nut and screw, at a speed governed by the speed of advance of said first abutment, and a second and fixed abutment which coacts with the screw to prevent further advance of the screw and nut and therefore of the slide.

Figure 4:
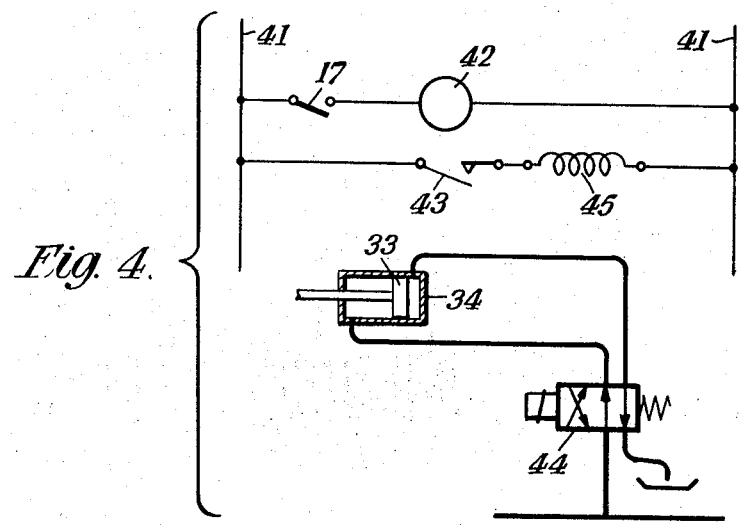
Figure 5:
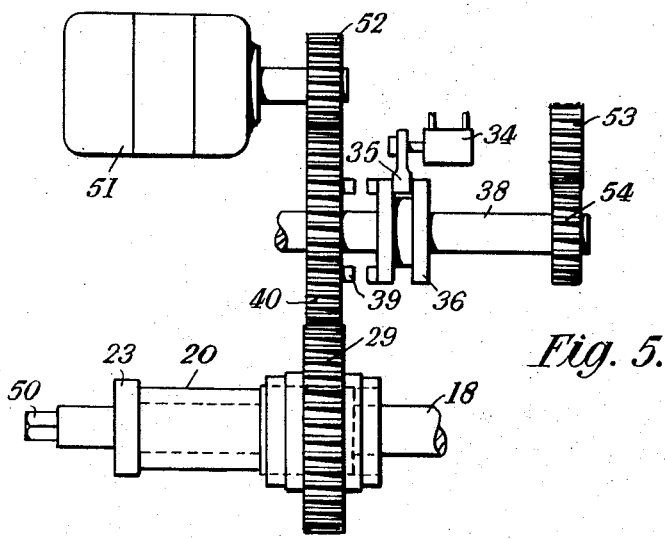
Figure 2:
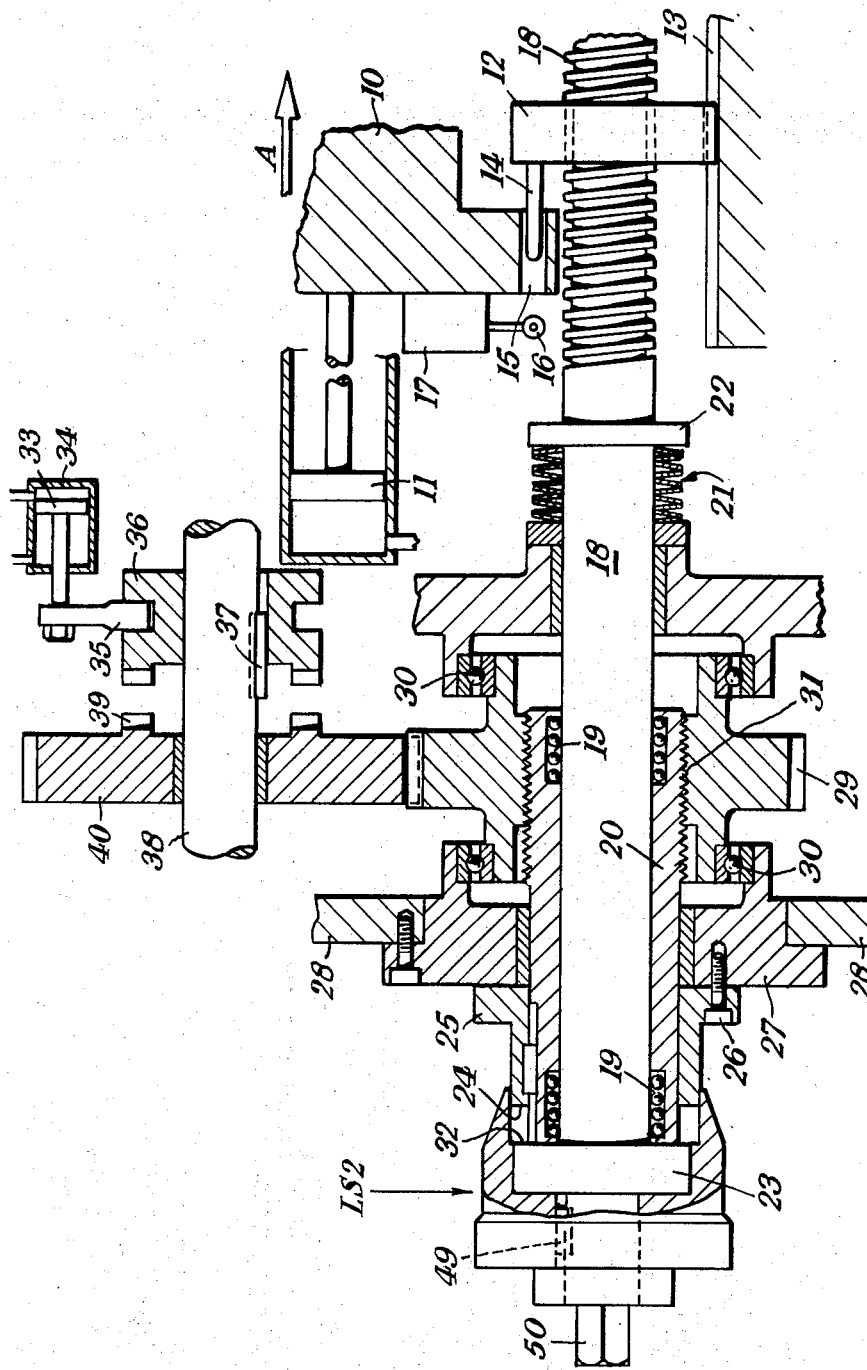
Figure 3:
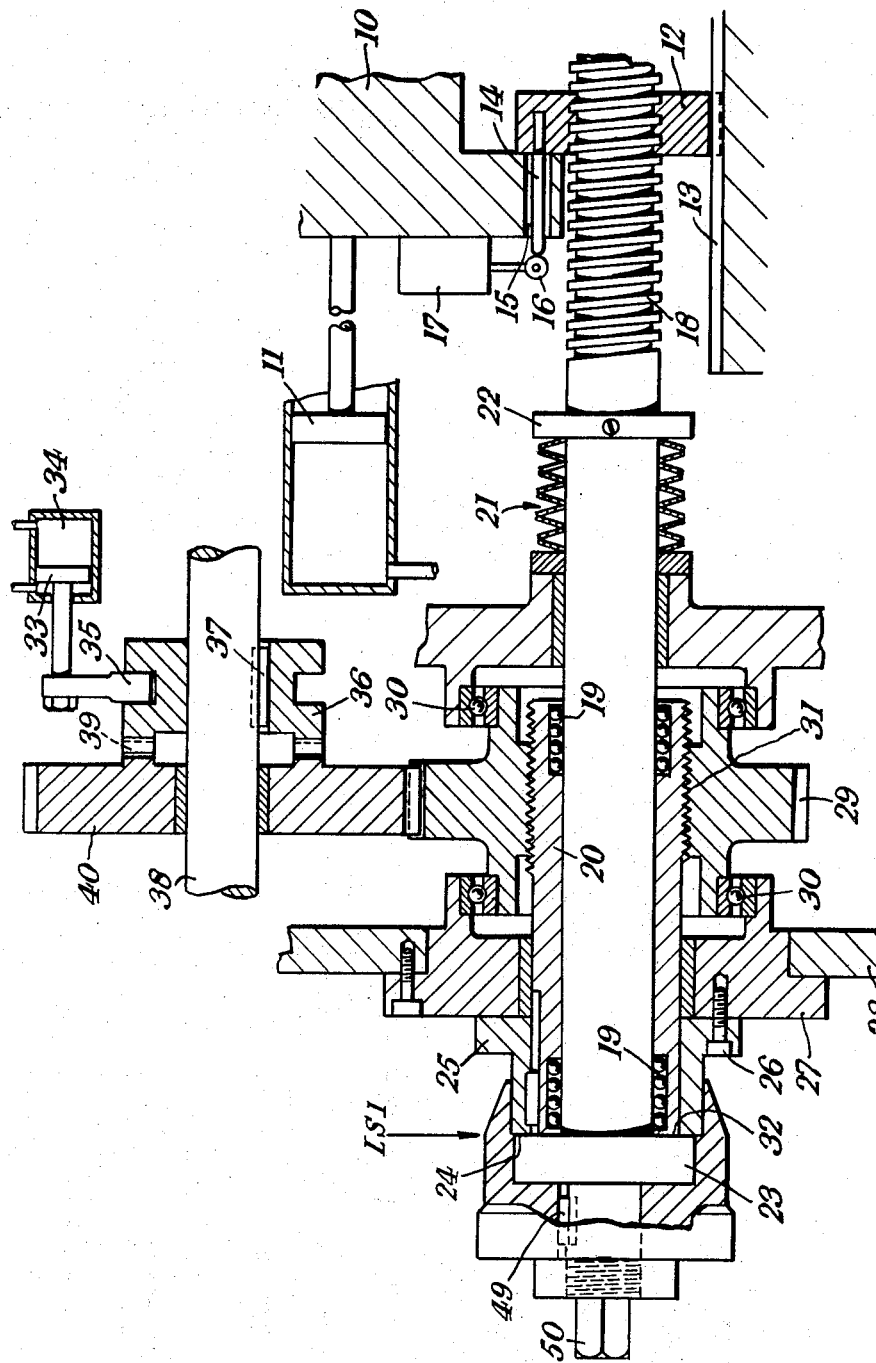

One embodiment of the invention is illustrated, by way of example, in FIGS. 2 – 5 of the accompanying drawings, in which:

FIG. 2 is a diagrammatic sectional view of the deadstop mechanism in the position which it occupies at the start of a machine cycle, FIG. 3 is a similar view showinng the slide moved to its final position, FIG. 4 is a circuit diagram, and FIG. 5 shows provision for resetting the deadstop mechanism.

FIG. 2 shows a slide 10 which can be advanced in the direction of the arrow A by a hydraulically operated piston 11 to cause a tool (not shown but carried by the slide) to perform a machining operation. In operation, and as described below, the slide 10 is advanced rapidly until, as shown in FIG. 3, it contacts a nut 12, which is prevented from rotation by a key 13 on the base of the machine, and thereafter advances further at a controlled slower rate until it is arrested at a determined final position. The key 13 engages a slot in the nut 12, which carries a pin 14 which extends into a hole 15 in the slide 10. When, upon abutment of the slide 10 with the nut 12, a roller 16 on a limit switch 17 mounted on the slide 10 contacts the pin 15, the switch 17 is activated to initiate further advance of the slide 10 as described below.

The nut 12 engages a screw 18 which is axially movable in bearings 19 in a sleeve 20. A spring 21, which acts on a collar 22 on the screw 18, urges the screw forwardly, i.e., to the right as seen in the drawing, and seeks to maintain a shoulder 23 on the screw 18 in engagement with the end face 24 of a collar 25 which is fixed by screws 26 to a housing 27 which surrounds the sleeve 20 and is fixed to a frame member 28 of the machine. The sleeve 20 is axially movable in the housing 27 but is prevented from rotation by a key 49 interposed between the sleeve 20 and the collar 25. The sleeve 20 has an external screw thread engaging an internal screw thread on a gear 29 which is located radially and axially in the machine frame by bearings 30. The screw-threaded connection is shown diagrammatically at 31.

By rotation of the gear 29, therefore, the sleeve 20 can be moved to the position shown in FIG. 2 causing its end face 32 to shift the shoulder 23 away from the end face 24 of the collar 25, so moving the screw 18 and the nut 12 to the left and compressing the spring 21.

A machine cycle commences with the sleeve 20 so shifted as shown in FIG. 2. Hydraulic pressure is applied to the piston 11 to cause the slide 10 to advance rapidly in the direction of the arrow A until it contacts the nut 12, which would normally then arrest its advance. However, actuation of the switch 17 (FIG. 3) by the pin 16 causes a piston 33 to move to the left in a cylinder 34 and cause a stirrup 35 to shift to the left a clutch member 36, keyed by a key 37 to a drive shaft 38 which rotates throughout the machine cycle. This engages the clutch member 36 with a cooperating clutch member 39 fixed to a gear 40, which is loose on the shaft 38 and in mesh with the gear 29, to cause rotation of the gear 40 and therefore of the gear 29. Rotation of the gear 29 causes the sleeve 20 to move to the right from the position shown in FIG. 2. The hydraulic pressure applied by the piston 11 through the slide 10 to the nut 12 then causes the screw 18 to follow the movement of the sleeve 20, with the shoulder 23 remaining in contact with the end face 32 of the sleeve 20. Further advance of the slide 10 accompanied by movement of the nut 12 and the screw 18, at a speed determined by the speed of rotation of the gear 29, is thus permitted until the advance is finally stopped by contact of the shoulder 23 with the end face 24 of the collar 25 as shown in FIG. 3.

By rotation of the screw 18 by application of a wrench to its squared left hand end 50, the position of the nut 12 on the screw 18 can be adjusted and therefore the positions at which advance of slide 10 will be decelerated and finally stopped.

As shown in FIG. 4, closure of the switch 17, upon contact between the slide 10 and the nut 12, completes a circuit between lines 41 to energize a relay 42. This causes a relay contact 43 to close, to energize a solenoid 45 and thereby cause a solenoid-controlled valve 44 to operate to admit pressure to the cylinder 34 and thereby cause the piston 33 to move out of the cylinder to engage the clutch 36, 39 as already described.

A resetting motor 51 (FIG. 5), geared to the gear 40 by a pinion 52, is provided for resetting the mechanism. During advance of the slide 10 the shaft 38 is rotated from the transmission of the machine, as already described, through gears 53, 54 (FIG. 5). When the clutch 36, 39 is engaged to clutch the gear 40 to the shaft 38 and so cause the sleeve 20 to move to the right as already described the motor 51, which is then not energized, is driven in reverse by the gear 40. After the shoulder 23 has made contact with the end face 24 of the collar 25, as shown in FIG. 3, to arrest the slide 10 in its final position a limit switch LSI is closed. Closure of this switch de-energizes the relay 42 (FIG. 4) and causes the valve 44 to reverse its position, with the result that the piston 33 moves into the cylinder to disengage the clutch 36, 39. The mechanism remains in the position shown in FIG. 3 until conclusion of the machine cycle, which may involve feed motions of other slides. After all feed motions have been completed, the slide 10 is retracted to the left by the piston 11, whereupon the resetting motor 51 is energized and drives the gear 33 in the reverse direction to move the sleeve 20 to the left. When the sleeve 20 has regained the starting position shown in FIG. 2, a second limit switch LS2 is closed and this de-energizes the motor 51.

The dead stop mechanism according to the invention therefore also provides for a controlled feed motion of the slide to a pre-set final position. It is particularly useful in a gear hobbing machine, in which it is most convenient to provide a rate of feed which is directly proportional to the speed of a machine shaft, for example a shaft carrying the machine worktable. This can be achieved by providing a mechanical connection between this shaft and the shaft 38.

What I claim as my invention and desire to secure by Letters Patent is:

1. In a machine tool, the combination of a slide, means for advancing the slide, a screw which is movable both axially and rotationally, a non-rotatable nut which is carried by the screw and acts as a dead stop to arrest advance of the slide, means urging the screw yieldably in the direction of advance of the slide into engagement with a first abutment, means for advancing said first abutment after contact of the slide with the nut to permit further advance of the slide, accompanied by advance of the nut and screw, at a speed governed by the speed of advance of said first abutment, and a second and fixed abutment which coacts with the screw to prevent further advance of the screw and nut and therefore of the slide.

2. In a machine tool, a combination as claimed in claim 1 wherein the first abutment is an end face of a sleeve which surrounds the screw and is capable of axial movement but restrained against rotation, and which includes a gear on the sleeve and in screw-threaded connection therewith and means responsive to contact of the slide with the nut for imparting rotation to the gear and therefore axial movement to the sleeve to advance said first abutment.

3. In a machine tool, a combination as claimed in claim 2 wherein the second abutment is an end face of a fixed collar surrounding the sleeve.

4. In a machine tool, a combination as claimed in claim 2 wherein said responsive means comprises a limit switch operated in response to contact of the slide with the nut and a clutch engageable in response to operation of the limit switch to impart rotation to a gear meshing with the gear on the sleeve.

5. In a machine tool, a combination as claimed in claim 1, wherein the means yieldably urging the screw in the direction of advance of the slide is a spring acting on a collar on the screw.

* * * * *